(12) United States Patent
Marangon et al.

(10) Patent No.: US 11,724,772 B2
(45) Date of Patent: Aug. 15, 2023

(54) TOOTHED WHEEL ASSEMBLY FOR A CASSETTE

(71) Applicant: CAMPAGNOLO S.r.l., Vicenza (IT)

(72) Inventors: Christian Marangon, Thiene (IT);
Marco Porro, Abano Terme (IT);
Marco Marchi, Marzabotto (IT)

(73) Assignee: CAMPAGNOLO S.r.l., Vicenza (IT)

( * ) Notice: Subject to any disclaimer, the term of this patent is extended or adjusted under 35 U.S.C. 154(b) by 77 days.

(21) Appl. No.: 17/500,112

(22) Filed: Oct. 13, 2021

(65) Prior Publication Data

US 2022/0135180 A1  May 5, 2022

(30) Foreign Application Priority Data

Oct. 29, 2020 (IT) ........................ 102020000025657

(51) Int. Cl.
*B62M 9/10* (2006.01)
*F16H 55/30* (2006.01)

(52) U.S. Cl.
CPC .............. *B62M 9/10* (2013.01); *F16H 55/30* (2013.01)

(58) Field of Classification Search
CPC .................................. B62M 9/10; F16H 55/30
USPC ........................................................ 474/160
See application file for complete search history.

(56) References Cited

U.S. PATENT DOCUMENTS

| 4,439,172 | A | * | 3/1984 | Segawa | ................. | B62M 9/105 |
| | | | | | | 74/447 |
| 4,475,894 | A | | 10/1984 | Sugino | | |
| 4,642,075 | A | * | 2/1987 | Nagashima | ............ | B62M 9/105 |
| | | | | | | 474/158 |
| 10,160,030 | B2 | * | 12/2018 | Earle | ....................... | B60B 1/003 |
| 2012/0244976 | A1 | * | 9/2012 | Lin | ........................... | B62M 9/10 |
| | | | | | | 474/160 |
| 2017/0057598 | A1 | | 3/2017 | Thrash et al. | | |
| 2018/0229802 | A1 | * | 8/2018 | Civiero | ................... | F16H 55/30 |
| 2018/0257742 | A1 | | 9/2018 | Chen | | |

FOREIGN PATENT DOCUMENTS

| EP | 3 459 836 A1 | 3/2019 | | |
| WO | WO-2018041409 A1 | * | 3/2018 | .............. B62M 9/10 |

OTHER PUBLICATIONS

Italian Search Report and Written Opinion in Italian Application No. 102020000025657, dated Jun. 10, 2021 with English translation.

* cited by examiner

*Primary Examiner* — Gene O Crawford
*Assistant Examiner* — Emily R Kincaid
(74) *Attorney, Agent, or Firm* — Steinfl + Bruno LLP (57) ABSTRACT

The invention relates to a toothed wheel assembly for a cassette having a first toothed wheel and a second toothed wheel that are concentric. The second tooth wheel has a greater number of teeth than the first toothed wheel; a radially inner cylindrical portion to engage a sprocket support body; a plurality of spokes comprising respective first constraining portions to the first toothed wheel and second constraining portions to the radially inner cylindrical portion; and a plurality of connection bodies that connect the first. The second toothed wheel has an axially-extending portion with at least one pair of spokes having connection bodies that include axially-extending portions in the circumferential direction and at least partially contained in the minimum circumferential extension a respective spoke.

19 Claims, 6 Drawing Sheets

TOOTHED WHEEL ASSEMBLY FOR A CASSETTE

CROSS REFERENCE TO RELATED APPLICATION

This application claims the benefit of Italian Application No. 102020000025657, filed on Oct. 29, 2020, which is incorporated herein by reference as if fully set forth.

FIELD OF INVENTION

The present invention relates to a toothed wheel assembly for a bicycle cassette.

BACKGROUND

In the rest of the present description and in the following claims, the expression "toothed wheel assembly" is meant to indicate the whole of at least two toothed wheels configured to make at least one part of the cassette for a rear wheel of a bicycle.

The toothed wheel assembly is intended to be mounted on a free body of a hub of a bicycle rear wheel to be engaged by a transmission chain.

As known, the motion transmission system of a bicycle comprises a pair of pedal cranks, on which the cyclist exerts a propulsive thrust, one or more guiding toothed wheels, set in rotation by direct coupling with the pedal cranks, and a plurality of driven toothed wheels, also called sprockets, of different sizes, set in rotation by the driving toothed wheels through a chain.

The sprockets are coupled with the rear wheel of the bicycle through a hub. This comprises a body rigidly constrained to the rim of the bicycle through spokes, and a sprocket support body rigidly coupled with the sprockets and capable of rotating free with respect to the first body in a direction of rotation, and of dragging it in rotation in the opposite direction, thus imposing the advancing motion on the driving rear wheel. In the technical jargon, the sprocket support body is called "free body". The totality of the sprockets, or toothed wheels, mounted on the free body is commonly called "cassette".

The chain consists of a succession of links, each normally consisting of a pair of small plates facing one another and spaced to define an insertion space of a tooth of a toothed wheel. The small plates of a link are rotatably coupled with the small plates of the next link through a pin, which is in turn wound by a roller or bush capable of rotating freely with respect to the pin.

The sprockets in general are made of extremely strong material (like for example steel or titanium) to withstand the wearing generated by the sliding of the chain and the loads to which they are subjected during operation.

The sprockets of the cassette can comprise a radially inner annular portion provided with grooves adapted for engaging the grooves of the sprocket support body. In this case, the sprockets are axially spaced apart by spacers usually of cylindrical shape.

Alternatively, the sprockets of the cassette can be connected together to form a toothed wheel assembly supported by a radially inner cylindrical portion having a radially inner surface provided with grooves adapted for engaging the grooves of the sprocket support body.

In this last case, the mutually axially connected sprockets can be two or more, even up to the totality of the sprockets that make the cassette.

Document US 2018/0229802A1 shows a toothed wheel assembly comprising three sprockets, which makes a so-called triplet, said assembly being able to be associated with further assemblies of toothed wheels or with single toothed wheels to define the cassette. In this document, the toothed wheel of the triplet having intermediate dimensions is connected to the toothed wheel of larger dimensions through a plurality of connection bodies wherein each connection body comprises a first connection portion constrained to the toothed wheel of larger dimensions that extends radially towards the toothed wheel of intermediate dimensions and a second connection portion constrained to the toothed wheel of intermediate dimensions that extends in the axial direction. A plurality of spokes connects a radially inner cylindrical portion to the toothed wheel of intermediate dimensions and to the toothed wheel of smaller dimensions.

The Applicant has observed that the triplet described has excellent mechanical features, in other words it is capable of transferring the torque exerted on the pedal cranks to the rear wheel without plastically deforming it and, at the same time, has a low weight.

The Applicant has however felt the need to provide a toothed wheel assembly for a cassette that is even lighter without however compromising the mechanical features thereof.

SUMMARY

The Applicant has perceived that a toothed wheel assembly can be lightened if material is removed from the toothed wheels at parts thereof that do not have structural function and that are not necessary to interact with the chain. For example, the radially outer edge of the toothed wheels is shaped with a plurality of teeth interspersed with throats that are necessary to engage the chain and, therefore, they cannot be removed or modified without compromising the correct functionality of the toothed wheel assembly. The connection bodies that connect the first and the second toothed wheel, axially spacing them, are necessary to ensure an adequate structural strength of the toothed wheel assembly. Once the number of connection bodies strictly necessary and sufficient to ensure such structural strength has been selected, it is not possible to further reduce the number of connection bodies.

The Applicant has noted that the radially inner edge of the toothed wheels does not have any structural function and does not interact with the chain.

The Applicant has thus hypothesized to remove material from the radially inner edge of the toothed wheels, reducing to the minimum possible the radial thickness of the toothed wheels (in other words the distance between the radially outer edge and the radially inner edge of the toothed wheel). The Applicant has perceived that such a reduction of material can go up to a minimum limit of racial thickness that in any case ensures that during use the toothed wheel is never subjected to plastic deformations.

The Applicant has however noted that the axially-extending portions of the connection bodies that connect the first to the second toothed wheel must necessarily be sufficiently radially spaced from the radially outer edge of the first toothed wheel to ensure that the chain (when it engages the teeth of the first toothed wheel) does not interfere with the axially-extending portions of the connection bodies.

The Applicant has verified that the removal of material from the radially inner edge of the first toothed wheel can be pushed, without compromising the structural features of the toothed wheel, to the point such that the axially-extending portions of the connection bodies are further, with respect to the radially inner edge, from the radially outer edge of the first toothed wheel.

The Applicant has thus noted that the presence of the connection bodies does not allow a removal of material along the entire circumferential extension of the radially inner edge of the first toothed wheel.

The Applicant has perceived that by positioning connection bodies at at least one pair of spokes, it is possible to further decrease the weight of the toothed wheel assembly.

In particular, the Applicant has perceived that by providing connection bodies at at least one pair of spokes so that the radial projection of the axially-extending portions of the connection bodies is at least partially contained in the minimum extension in the circumferential direction of the respective spoke, it is possible to constrain at least one part of the connection body to the portion of spoke connected to the first toothed wheel.

This allows to use structural elements already present (the spokes) at the radially inner edge of the first toothed wheel to position at least some connection bodies, thus freeing radially inner edge portions of the first toothed wheel from connection bodies.

In this way, material can be removed from the radially inner edge portions of the first toothed wheel freed from the presence of connection bodies, decreasing the total weight of the toothed wheel assembly.

BRIEF DESCRIPTION OF THE DRAWING(S)

Further features and advantages of the invention will become clearer from the following description of preferred embodiments thereof, made with reference to the attached drawings. In such drawings.

DETAILED DESCRIPTION OF THE PREFERRED EMBODIMENTS

The present invention therefore relates to a toothed wheel assembly for a cassette comprising: at least one first toothed wheel having a center and a second toothed wheel concentric to the first toothed wheel wherein the second toothed wheel has a number of teeth greater than the number of teeth of the first toothed wheel;

a radially inner cylindrical portion configured to engage a sprocket support body of a bicycle wheel;

a plurality of spokes comprising respective first constraining portions to the first toothed wheel and second constraining portions to the radially inner cylindrical portion to constrain the first toothed wheel to the radially inner cylindrical portion;

a plurality of connection bodies that mechanically connect the first and the second toothed wheel and wherein each connection body comprises an axially-extending portion to axially space the first toothed wheel from the second toothed wheel;

wherein at at least one pair of spokes there are respective connection bodies having said axially-extending portions with an extension in the circumferential direction, the radial projection of said extension in the circumferential direction is at least partially contained in the minimum extension in the circumferential direction of a respective spoke.

The toothed wheel assembly is configured to rotate about a rotation axis coinciding with the rotation axis of the rear wheel. Such a rotation axis passes through the center of each sprocket (or toothed wheel) and it is the main reference axis for the elements that form part of the present invention; all indications of direction and similar, such as "axial", "radial", "circumferential" and "diametral" will be made with reference to it; equally, the indications "towards the outside" and "towards the inside" referring to radial directions must be interpreted as away from the axis or towards the axis.

The extension in the circumferential direction of an element is therefore defined as the distance that separates two end portions of such an element along a circumferential direction.

The radial projection of the circumferential extension of an element is defined by the ideal translation along the radial direction of such an element.

The toothed wheel assembly of the present invention can comprise one or more of the following preferred features, individually or in combination.

Preferably, said axially-extending portion of each connection body provided at a respective spoke has an extension in the circumferential direction the radial projection of which is completely contained in the maximum extension in the circumferential direction of a respective spoke at the second constraining portion thereof to said radially inner cylindrical portion.

In this way, each connection body provided at a respective spoke extends completely from the respective spoke. This allows to further increase the radially inner edge portions of the first toothed wheel freed from the presence of the connection bodies.

Preferably, a respective connection body is provided at each spoke.

In this way, all of the spokes are used to connect a respective connection body, maximizing the radially inner edge portions of the first toothed wheel freed from the presence of the connection bodies.

Preferably, the first toothed wheel has a radially outer edge that defines a sequence of teeth interspersed by recesses.

The radially inner edge of the first toothed wheel is opposite the radially outer edge.

Preferably, each spoke is connected to the radially inner edge of the first toothed wheel.

Preferably, a first radial distance, measured with respect to the center of the first toothed wheel, of a radially innermost point of any connection body is less than a second radial distance, measured with respect to the center of the first toothed wheel, of a radially outermost point of the radially inner edge of the first toothed wheel.

The second radial distance is preferably selected so that the thickness in the radial direction of the first toothed wheel is the minimum that ensures that the first toothed wheel, during use, does not plastically deform.

Preferably, between two circumferentially consecutive connection bodies, said radially inner edge of the first toothed wheel lies on a reference circumference centered on the center of the first toothed wheel.

Preferably, said second radial distance is measured with respect to said reference circumference.

In this way, the second radial distance is constant along the entire circumferential extension of the radially inner edge of the first toothed wheel.

In the case in which the first toothed wheel has dimensions such that the connection bodies arranged at the spokes are not sufficient to ensure the necessary mechanical features of the toothed wheel assembly, at least one intermediate connection body is preferably provided.

Preferably, between two connection bodies arranged at two circumferentially adjacent spokes at least one intermediate connection body is provided that mechanically connects the first and the second toothed wheel to axially space them.

Preferably, each intermediate connection body has a third radial distance of a radially innermost point thereof measured with respect to the center of the first toothed wheel.

Preferably, said third radial distance is less than said second radial distance.

In this way, each intermediate connection body does not interfere with the chain when the chain is engaged on the first toothed wheel.

Preferably, the third radial distance is greater than the first radial distance.

In this way, the intermediate connection bodies are radially closer to the radially outer edge of the first toothed wheel with respect to the connection bodies arranged at the spokes.

Preferably, the third radial distance is selected so as to be the minimum distance from the radially outer edge of the first toothed wheel that allows a correct engagement of the chain on the first toothed wheel.

Therefore, the connection bodies provided at the spokes can be more spaced from the radially outer edge of the first toothed wheel to increase the mechanical strength in the coupling between the first and the second toothed wheel.

This allows to arrange, when present, intermediate connection bodies of smaller circumferential dimensions.

Concerning this, preferably each intermediate connection body comprises an axially-extending portion connected to the first toothed wheel.

Preferably, the axially-extending portion of the intermediate connection bodies has a circumferential extension less than the circumferential extension of the axially-extending portion of the connection bodies at the spokes.

Preferably, the first radial distance and the second radial distance are linked by the formula $0.2<RP/[(R2-R1)*R1]<1$, where RP is the primitive radius of the second toothed wheel, R2 is the second radial distance and R1 is the first radial distance.

The primitive radius of a toothed wheel is defined as the radius of the circumference centered on the center of the toothed wheel assembly and that passes through the center of the bushes of the chain when the latter is engaged on such a toothed wheel. The primitive radius can be expressed by the formula $RP=0.5*\text{chain pitch}*[1/(\sin(180°/\text{number of teeth of the toothed wheel}))]$, where the chain pitch is the distance between the center of two adjacent bushes of the chain (usually 12.7 millimeters).

The Applicant has found that such a formula allows to correlate the first and the second radial distance with each other within a range that simultaneously ensures adequate structural features of the toothed wheel assembly and small radial dimensions of the connection bodies provided at the spokes.

More preferably, the first radial distance and the second radial distance are linked by the formula $0.4<RP/[(R2-R1)*R1]<0.8$, where RP is the primitive radius of the second toothed wheel, R2 is the second radial distance and R1 is the first radial distance.

As an example, the difference between the second radial distance and the first radial distance is comprised between 1 and 7 millimeters, more preferably between 4.5 and 3.5 millimeters, for example 4.0 millimeters.

Preferably, the third radial distance and the second radial distance are linked by the formula $0.2<RP/[(R2-R3)*R3]<1$, where RP is the primitive radius of the second toothed wheel, R2 is the second radial distance and R3 is the third radial distance.

The Applicant has found that such a formula makes it possible to correlate the third and the second radial distance with each other within a range that simultaneously ensures that the chain does not interfere with the intermediate connection bodies and that the dimensions of the intermediate connection bodies are small.

More preferably, the third radial distance and the second radial distance are linked by the formula $0.4<RP/[(R2-R3)*R3]<0.8$, where RP is the primitive radius of the second toothed wheel, R2 is the second radial distance and R3 is the third radial distance.

As an example, the difference between the second radial distance and the third radial distance is comprised between 1 and 7 millimeters, more preferably between 3.0 and 2.0 millimeters, for example 2.5 millimeters.

Preferably, the circumferential extension given by the sum of the circumferential extensions of the axially-extending portions of the connection bodies at the spokes and of the intermediate connection bodies is comprised between 70° and 110°.

Preferably, as the number of teeth of the first toothed wheel increases, the percentage of the circumferential extension given by the sum of the circumferential extensions of the axially-extending portions of the intermediate connection bodies with respect to the circumferential extension given by the sum of the circumferential extensions of the axially-extending portions of the connection bodies arranged at the spokes increases.

Preferably, the circumferential extension given by the sum of the circumferential extensions of the axially-extending portions of the intermediate connection bodies is comprised between 40% and 65% of the circumferential extension given by the sum of the circumferential extensions of the axially-extending portions of the connection bodies arranged at the spokes and the axially-extending portions of the intermediate connection bodies.

More preferably, the circumferential extension given by the sum of the circumferential extensions of the axially-extending portions of the intermediate connection bodies is comprised between 55% and 60% of the circumferential extension given by the sum of the circumferential extensions of the axially-extending portions of the connection bodies arranged at the spokes and the axially-extending portions of the intermediate connection bodies.

As an example, in the case of a first toothed wheel having 23 teeth, the circumferential extension given by the sum of the circumferential extensions of the axially-extending portions of the intermediate connection bodies is about 57% of the circumferential extension given by the sum of the circumferential extensions of the axially-extending portions of the connection bodies arranged at the spokes and the intermediate connection bodies.

Preferably, each intermediate connection body comprises a radially-extending portion that extends in the radial direction towards the second toothed wheel.

Preferably, the radially-extending portion is circumferentially delimited by two end edges converging in the radially inner direction.

In this way, the intermediate connection bodies extend more circumferentially at the second toothed wheel and extend circumferentially less at the first toothed wheel, decreasing the total weight of each intermediate connection body.

Preferably, the two end edges of the radially-extending portions of the intermediate connection bodies subtending an angle to the center of the first toothed wheel comprised between 8° and 4°, more preferably comprised between 6° and 5°.

Preferably, each spoke comprises at least one central portion having a thickness in the axial direction less than the thickness in the axial direction of the radially inner cylindrical portion.

Preferably, such a central portion of each spoke is arranged between the first constraining portion and the second constraining portion.

Preferably, the thickness in the axial direction of the radially inner cylindrical portion is comprised between 2 and 3 times the thickness in the axial direction of the first toothed wheel.

Since in the toothed wheel assembly the toothed wheels are axially spaced apart, the thickness in the axial direction of the radially inner cylindrical portion is preferably less than the thickness in the axial direction of the toothed wheel assembly.

In order to allow a correct positioning without axial clearances of the toothed wheel assembly on the sprocket support body of the rear wheel, the toothed wheel assembly is preferably mounted with a spacer made of aluminum, or another material lighter than the material that makes the toothed wheel assembly, which is added to the axial thickness of the radially inner cylindrical portion to take it back to the same axial thickness of the entire toothed wheel assembly.

Preferably, the thickness in the radial direction of the radially inner cylindrical portion is comprised between 0.7 and 1 times the thickness in the axial direction of the first toothed wheel.

The toothed wheel assembly can also comprise a third toothed wheel having a number of teeth less than the number of teeth of the first toothed wheel.

Preferably, the third toothed wheel is constrained to the radially inner cylindrical portion by only the spokes.

In this way, the possible third toothed wheel can have a respective continuous radially inner edge between two adjacent spokes.

This can make it possible to remove material from the continuous radially inner edge and further decrease the weight of the triplet.

With reference now to the figures, some preferred embodiments of the toothed wheel assembly in accordance with the present invention are shown. Identical reference numerals refer to identical features of each embodiment, the differences between them will be clear hereinafter.

The toothed wheel assembly is indicated as a whole with 10.

The toothed wheel assembly 10 comprises a plurality of toothed wheels 11, 12, 13, or sprockets, of mutually different dimensions, arranged parallel to one another and concentric about a rotation axis X.

In the examples illustrated in the attached figures, there are three toothed wheels 11, 12 and 13 and they make a so-called "triplet".

In other embodiments that are not illustrated, there can be more than three toothed wheels of the toothed wheel assembly, for example from four to eleven or twelve.

In any case, in all of the embodiments, the toothed wheel assembly 10 comprises at least two toothed wheels, in particular a first toothed wheel 12 and a second toothed wheel 13 in which the first toothed wheel 12 has a shorter radial extension than the radial extension of the second toothed wheel 13.

The toothed wheel assembly 10 has a center C through which the rotation axis X of the cassette passes.

Each toothed wheel 11, 12 and 13 comprises a plurality of teeth 14 separated from one another by a plurality of recesses 15.

The radial extension of each toothed wheel 11, 12 and 13 and in particular the diameter thereof, is determined by the number of teeth 14 thereof. The greater the number of teeth 14, the greater the radial extension of the toothed wheel.

The pitch between the teeth 14, in other words the distance that separates two successive teeth 14, is substantially constant for each toothed wheel and substantially identical in all of the toothed wheels 11, 12 and 13.

The teeth 14 are configured to receive the engagement of links of a transmission chain (not illustrated).

The first toothed wheel 12 is supported by a radially inner cylindrical portion 16 arranged radially inside the first toothed wheel 12. The center of the radially inner cylindrical portion 16 coincides with the center C of the assembly of toothed wheels 10.

The radially inner cylindrical portion 16 is configured to engage a sprocket support body (not illustrated) of the hub of the rear wheel of the bicycle. For this purpose, the radially inner cylindrical portion 16 comprises an interface surface 17 with the sprocket support body from which project a plurality of protuberances 18 intended to engage respective grooved profiles (not illustrated) arranged on the sprocket support body.

The mechanical coupling between the radially inner cylindrical portion 16 and the first toothed wheel 12 is obtained through a plurality of spokes 19 that extend from the radially inner cylindrical portion 16 and reach the first toothed wheel 12.

The spokes 19 are made in one piece with the first toothed wheel 12 and with the radially inner cylindrical portion 16.

As a function of the diameter of the first toothed wheel 12, from three to six spokes 19 can be provided. In the example illustrated in FIG. 1 five spokes 19 are provided and in the embodiment of FIG. 5 four spokes 19 are provided.

The spokes 19 have a rectilinear extension directed in the radial direction and comprise a first constraining portion 20 arranged close to the first toothed wheel 12 and joined to it and a second constraining portion 21 arranged close to the radially inner cylindrical portion 16 and joined to it. Between the first constraining portion 20 and the second constraining portion 21, each spoke 19 comprises a central portion 22.

Figure 4:
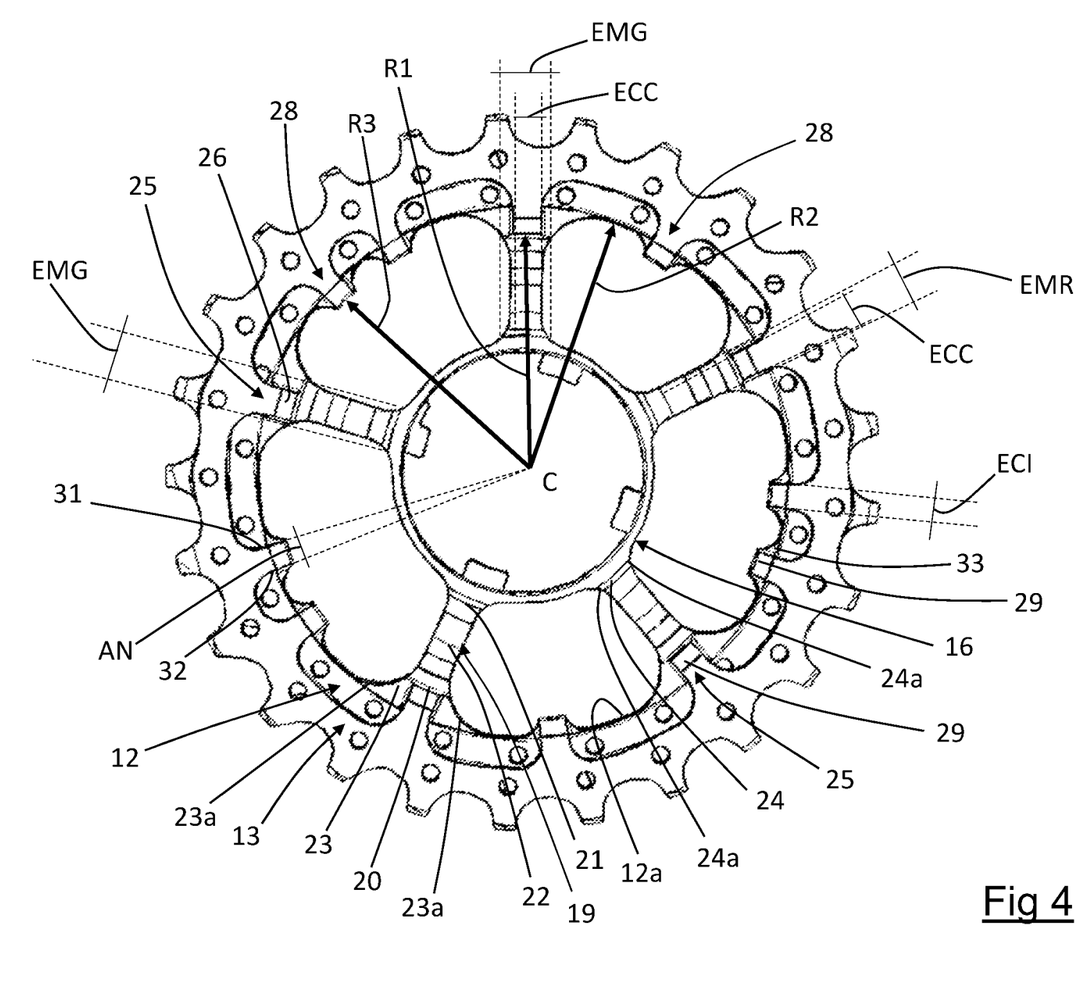
FIG. 4 is a further view of the details of FIG. 3.

As illustrated in FIG. 4, the first toothed wheel 12 comprises a radially inner edge 12a facing the radially inner cylindrical portion 16. Each spoke 19 is connected to the radially inner edge 12a of the first toothed wheel 12 at the first constraining portion 20. For this purpose, the first constraining portion 20 of each spoke 19 comprises a constraining zone 23 to the inner edge 12a of the first toothed wheel 12. The constraining zone 23 comprises two circumferentially opposite end edges 23a that join the spoke 19 to the radially inner edge 12a of the first toothed wheel 12. The two end edges 23a are arched to join the spoke 19 to the radially inner edge 12a of the first toothed wheel 12 without discontinuity of shape (in other words without corners). The constraining zone 23 has dimensions in the circumferential direction that gradually increase in the radially outer direction, until a maximum circumferential dimension is reached at the radially inner edge 12a of the first toothed wheel 12. In other words, the distance in the circumferential direction between the end edges 23a of the constraining zone 23 increases going away from the center of the first toothed wheel 12.

The second constraining portion 21 of each spoke 19 comprises a constraining zone 24 to the radially inner cylindrical portion 16. The constraining zone 24 comprises two circumferentially opposite end edges 24a that join the spoke 19 to the radially inner cylindrical portion 16. The two end edges 24a are arched to join the spoke 19 to the radially inner cylindrical portion 16 of the first toothed wheel 12 without discontinuity of shape (in other words without corners). The constraining zone 24 has dimensions in the circumferential direction that gradually increase in the radially inner direction, until a maximum circumferential dimension is reached at the radially inner cylindrical portion 16. In other words, the distance in the circumferential direction between the end edges 24a of the constraining zone 24 increases going closer to the center of the first toothed wheel 12.

Figure 1:
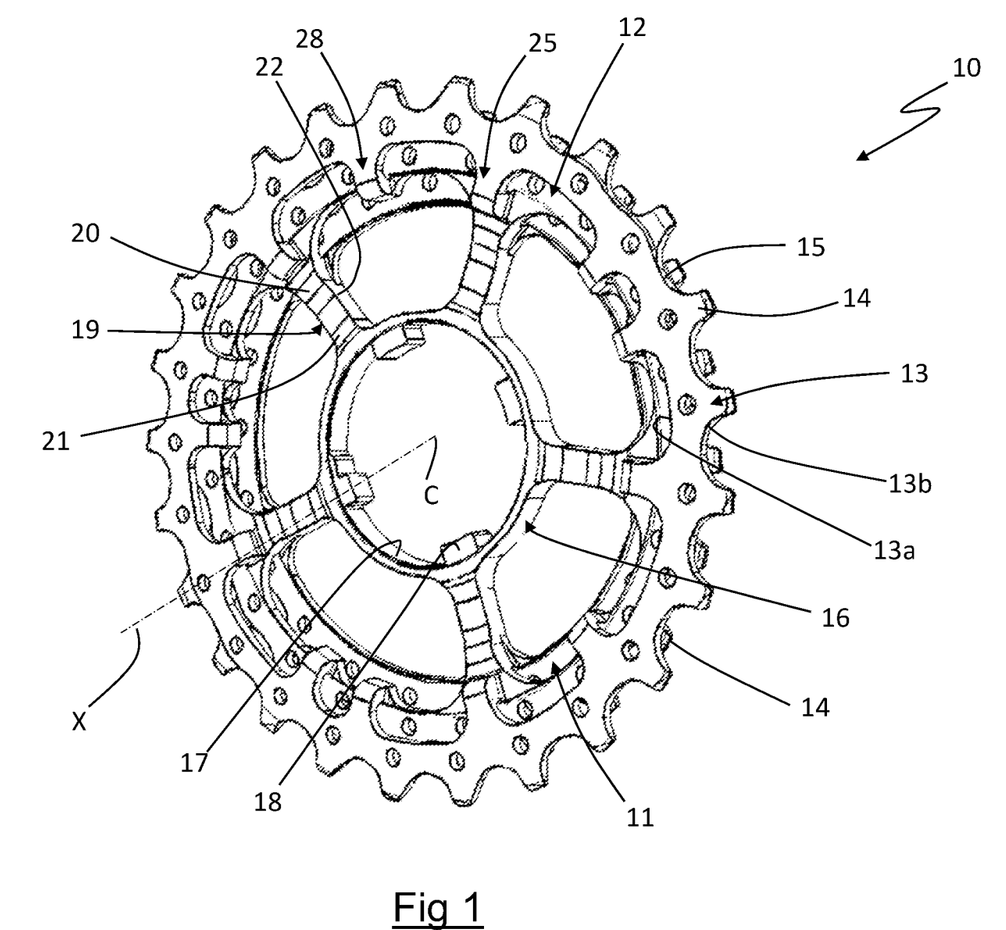
FIG. 1 is a perspective view of a toothed wheel assembly for a cassette according to the invention.
Figure 1A:
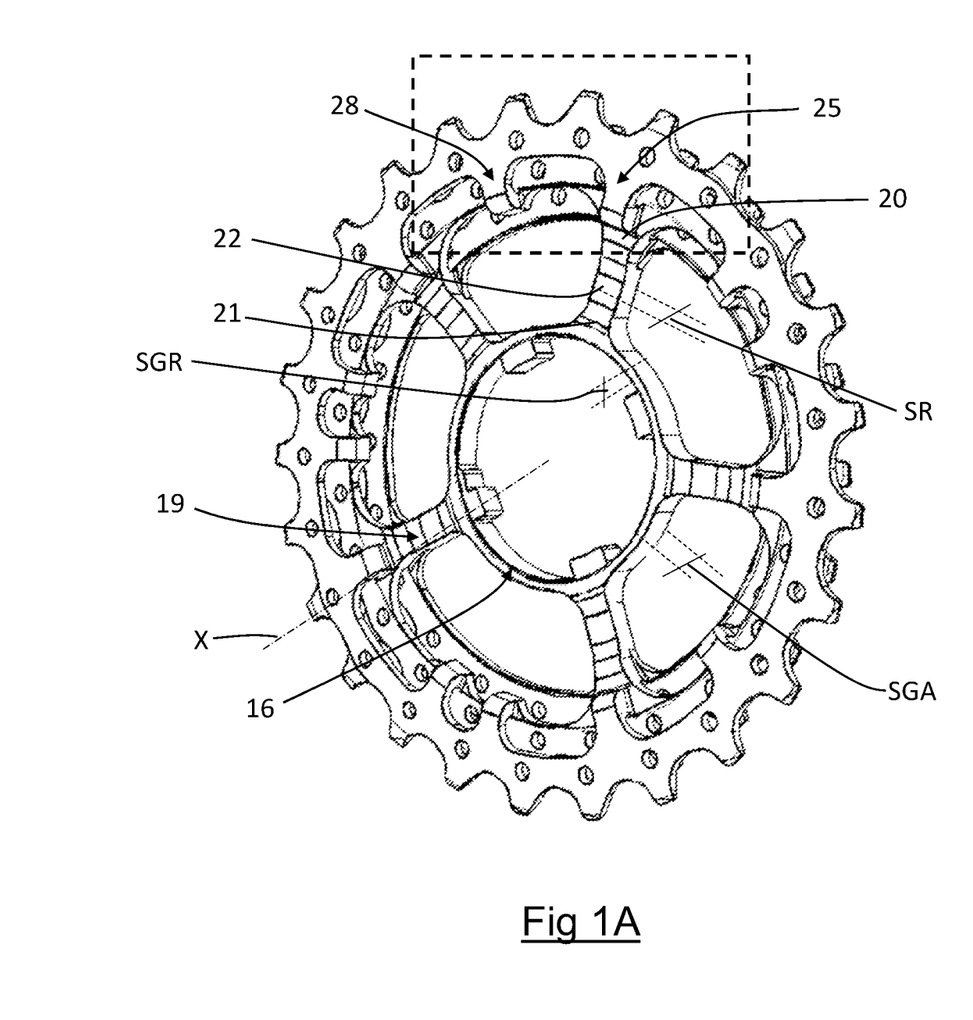
FIG. 1A is the same perspective view of the assembly of FIG. 1.

As illustrated in FIG. 1A, the central portion 22 of each spoke 19 has a thickness SR, measured in the axial direction and parallel to the rotation axis R, smaller than the thickness measured in the same direction of the first 20 and of the second constraining portion 21. The central portion 22 is joined without discontinuity (in other words without steps) to the first 20 and to the second constraining portion 21. The thickness SR of the central portion 22 is less than the thickness SGA in the same direction of the radially inner cylindrical portion 16. The second constraining portion 21 has a thickness substantially identical to the thickness SGA of the radially inner cylindrical portion 16.

The radially inner cylindrical portion 16 has a thickness SGA measured in the axial direction and parallel to the rotation axis X substantially equal to three times the thickness measured in the same direction of the first toothed wheel 12. The thickness in the axial direction of the first toothed wheel 12 is substantially equal to the thickness in the axial direction of the other toothed wheels. All of the toothed wheels of the toothed wheel assembly 10 have substantially the same thickness in the axial direction.

The thickness in the radial direction SGR of the radially inner cylindrical portion 16 is substantially equal to the thickness in axial direction of the first toothed wheel 12.

The ratio between the thickness in the axial direction SGA and the thickness in the radial direction SGR of the radially inner cylindrical portion 16 is comprised between 2 and 4.5, preferably 3.

The assembly 10 comprises connection bodies 25, arranged at at least two spokes 19, preferably at all of the spokes 19, that mechanically connect the first 12 and the second toothed wheel 13 spacing them in the axial direction.

The connection bodies 25 arranged at the spokes 19, hereinafter also called main connection bodies 25, each comprise an axially-extending portion 26 and a radially-extending portion 27, as better illustrated in FIG. 1B.

The radially-extending portion 27 is constrained to the second toothed wheel 13 and extends radially from it towards the first toothed wheel 12. The radially-extending portion 27 extends from a radially inner edge 13a of the second toothed wheel 13 and goes away from it in the radially inner direction.

The radially-extending portion 27 has a first joining zone 27a with the radially inner edge 13a of the second toothed wheel 13. The first joining zone 27a has curved surfaces to join to the radially inner edge 13a of the second toothed wheel 13 without sharp edges. The radially-extending portion 27 also has a second zone 27b that extends radially inwards from the first zone 27a. The second zone 27b has a substantially rectilinear radial extension and a substantially constant dimension in the circumferential direction. The thickness of the radially-extending portion 27, in other words the size thereof in the axial direction is substantially constant and is substantially equal to the thickness of the second toothed wheel 13. The second toothed wheel 13 is in one piece with the radially-extending portion 27.

The axially-extending portion 26 of the main connection bodies 25 is connected to the first toothed wheel 12 and extends axially with respect to it. The axially-extending portion extends from the second zone 27b of the radially-extending portion 27. The axially-extending portion 26 is formed in one piece with the radially-extending portion 27.

The axially-extending portion 26 is also formed in one piece with the first toothed wheel 12.

The axially-extending portion 26 extends in the axial direction by the same amount that axially separates the first 12 and the second toothed wheel 13.

The axially-extending portion 26 of each main connection body 25 has a minimum distance from the center C of the first toothed wheel at at least one point thereof.

In the preferred embodiment of the invention, the axially-extending portion 26 of each main connection body 25 has a radially inner surface 26a (illustrated in FIG. 1B) entirely arranged at a same minimum radial distance from the center C of the first toothed wheel 12.

Such a minimum radial distance, hereinafter first radial distance R1, is represented in FIG. 4.

The axially-extending portion 26 has a substantially constant extension in the circumferential direction ECC. In the preferred embodiment of the invention, the axially-extending portions 26 of all of the main connection bodies have the same extension in the circumferential direction ECC.

As shown in FIG. 4, the extension in the circumferential direction ECC of the axially-extending portions 26 of the main connection bodies 25 have a radial projection that is at least partially contained in the minimum extension in the circumferential direction EMR of a respective spoke 19.

The minimum extension in the circumferential direction EMR of a spoke 19 is, in the preferred embodiment of the invention, the extension of the spoke 19 at the central portion 22.

In the preferred embodiment of the invention, the extension in the circumferential direction ECC of the axially-extending portions 26 of the main connection bodies 25 have a radial projection that is completely contained in the maximum extension in the circumferential direction EMG of a respective spoke 19 at the radially inner cylindrical portion 16, as illustrated in FIG. 4.

The maximum extension in the circumferential direction EMG of a respective spoke 19 at the radially inner cylindrical portion 16 is defined by the maximum extension in the circumferential direction of the second constraining portion 21 of the spoke 19. As better illustrated in FIG. 4, the extension in the circumferential direction of a respective spoke 19 at the radially inner cylindrical portion 16 is measured at the constraining zone 24 of the second constraining portion 21 of the spoke 19. The maximum extension in the circumferential direction EMG of a respective spoke 19 at the radially inner cylindrical portion 16 corresponds to the maximum distance in the circumferential direction between the two end edges 24a of the constraining zone 24.

The first toothed wheel 12 has a radially outer edge 12b, opposite to the radially inner edge 12a, on which the teeth 14 and the recesses 15 of the first toothed wheel 12 are defined.

Figure 3:
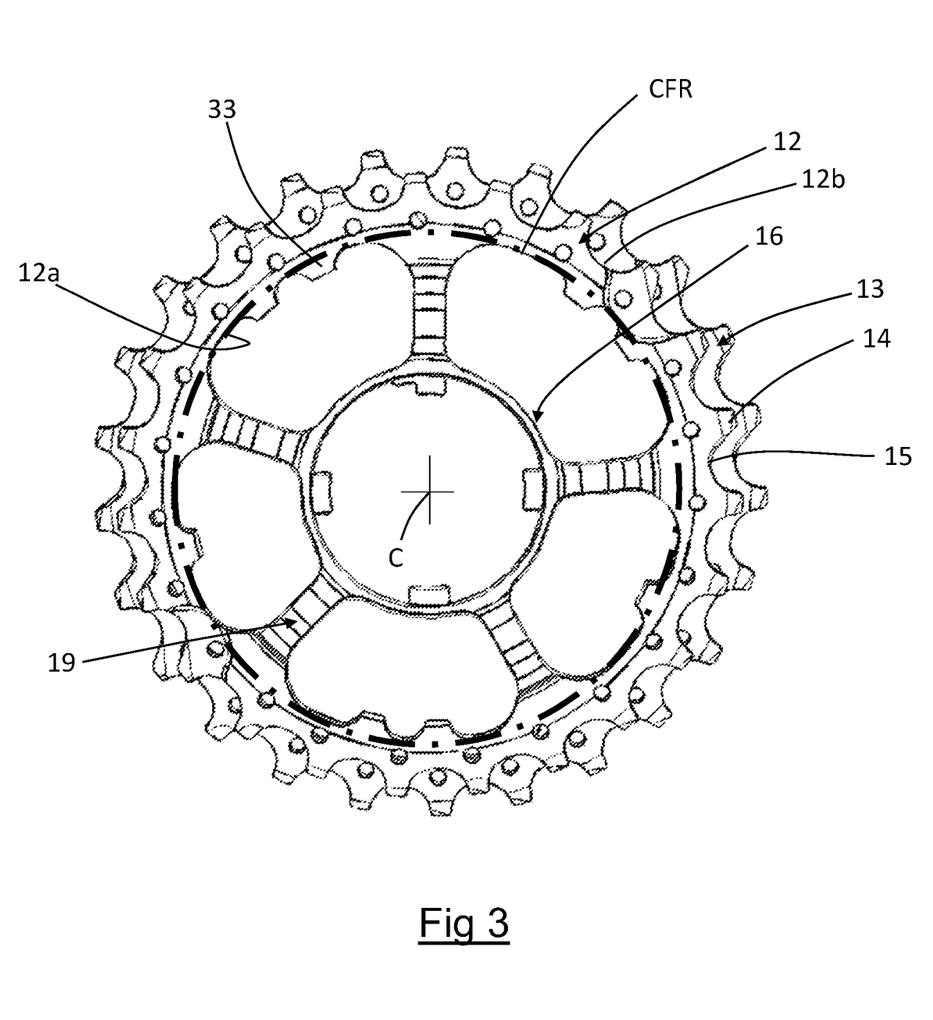
FIG. 3 is a view of some details of the assembly of FIG. 2 according to the section III-III.

The radially inner edge 12a is defined by the edge of the first toothed wheel 12 that lies substantially aligned with an ideal reference circumference CFR centered on the center C of the first toothed wheel 12 (FIG. 3).

The radially inner edge 12a of the first toothed wheel 12 is arranged a second radial distance R2 from the center C of the toothed wheel 12, as indicated in FIG. 4.

The second radial distance R2 is substantially constant along the entire radially inner edge 12a.

As represented in FIG. 4, the first radial distance R1 is less than the second radial distance R2, in other words the radially inner edge 12a of the first toothed wheel 12 is arranged at a greater distance from the center C of the first toothed wheel 12 with respect to the radially inner surface 26a of any axial portion 26 of the main connection bodies 25.

In the embodiments illustrated, between two main connection bodies 25 there is at least one intermediate connection body 28 that mechanically connects the first 12 and the second toothed wheel 13 to axially space them.

Figure 1B:
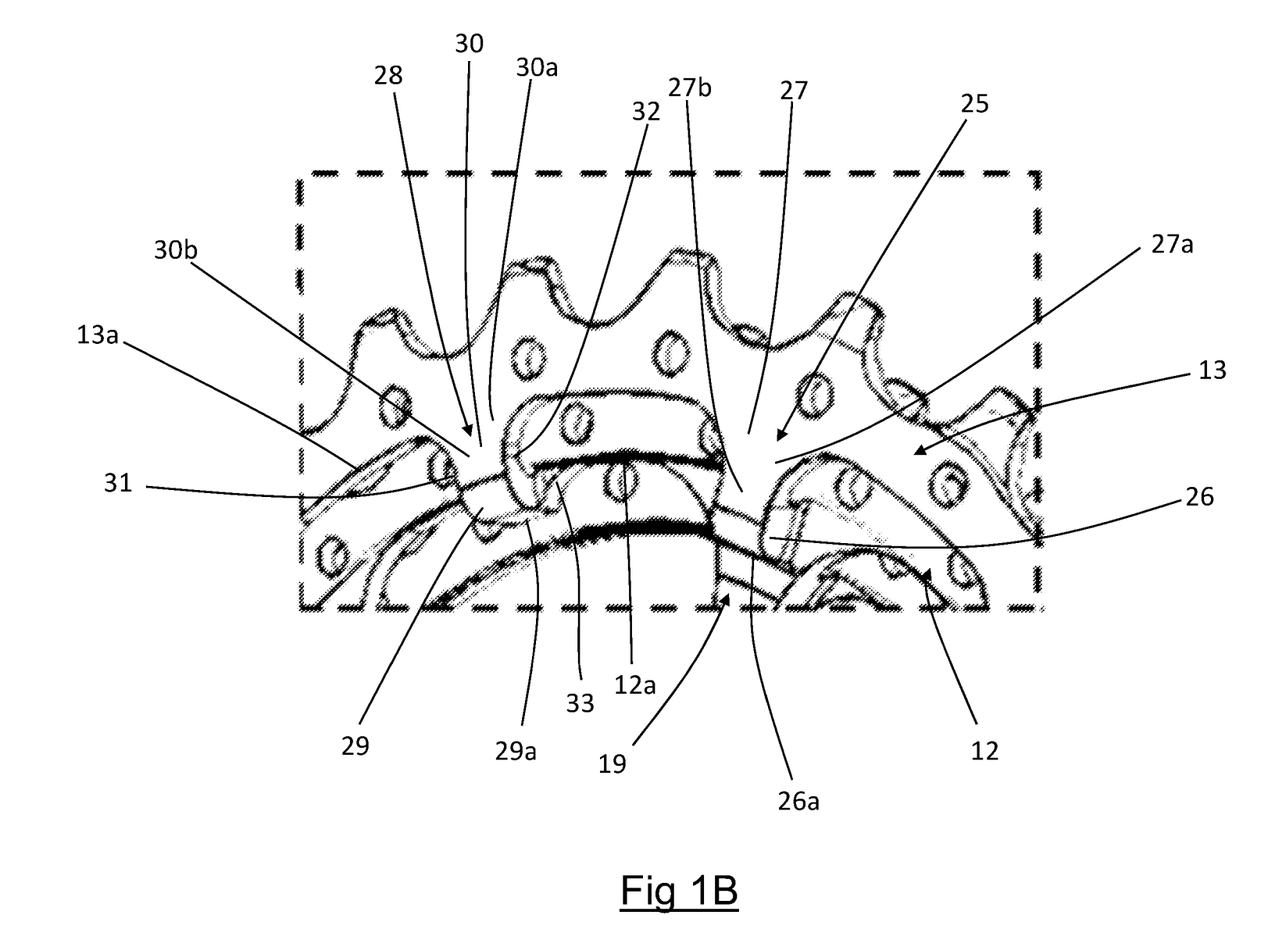
FIG. 1B is an enlargement of a detail of the assembly of FIG. 1A.
Figure 2:
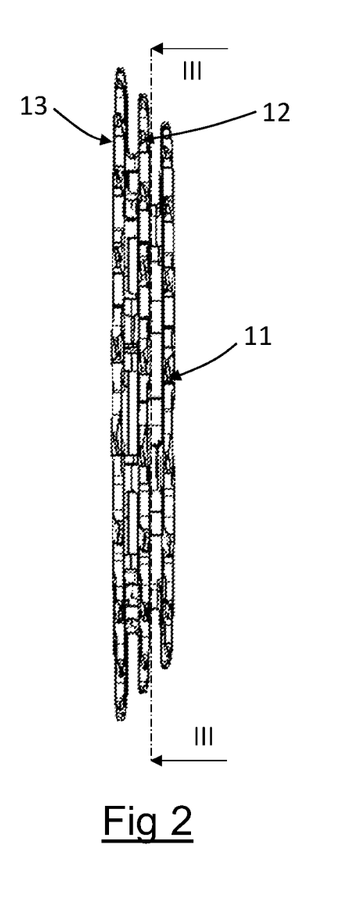
FIG. 2 is a side view of the assembly of FIG. 1.

Similarly to the main connection bodies 25, each intermediate connection body 28 comprises an axially-extending portion 29 and a radially-extending portion 30, as better illustrated in FIG. 1B.

The radially-extending portion 30 is constrained to the second toothed wheel 13 and extends radially from it towards the first toothed wheel 12. The radially-extending portion 30 extends from a radially inner edge 13a of the second toothed wheel 13 and goes away from it in a radially inner direction.

The radially-extending portion 30 has a first joining zone 30a with the radially inner edge 13a of the second toothed wheel 13. The first joining zone 30a has curved surfaces to join to the radially inner edge 13a of the second toothed wheel 13 without sharp edges. The radially-extending portion 30 also has a second zone 30b that extends radially inwards from the first zone 30a.

Each radially-extending portion 30 is circumferentially delimited by two end edges 31, 32 at the second zone 30b. Such end edges 31, 32 converge in the radially inner direction.

The two end edges 31, 32 subtend an angle to the center AN of the first toothed wheel comprised between 8° and 4° (FIG. 4).

In some embodiments, like for example in the embodiment of FIGS. 1 and 4, some intermediate connection bodies 28 are provided in which the end edges 31, 32 subtend an angle to the center AN greater than the angle to the center AN subtended by the two end edges 31, 32 of other intermediate bodies 28.

Preferably, intermediate connection bodies 28 are provided in which the two end edges 31, 32 subtend an angle to the center AN of 6° and intermediate connection bodies 28 in which the two end edges 31, 32 subtend an angle to the center AN of 5.25°. Preferably, the intermediate connection bodies 28 in which the two end edges 31, 32 subtend an angle to the center AN of 6° are provided in a number of one between two circumferentially adjacent spokes 19. The intermediate connection bodies 28 in which the two end edges 31, 32 subtend an angle to the center AN of 5.25° provided in a number of two between two circumferentially adjacent spokes 19. Preferably, between two circumferentially adjacent spokes 19 there are only two intermediate connection bodies 28 in which the two end edges 31, 32 subtend an angle to the center AN of 5.25° or only one intermediate connection body 28 in which the two end edges 31, 32 subtend an angle to the center AN of 6°.

The thickness of each radially-extending portion 30, in other words the dimension thereof in the axial direction is substantially constant and is substantially equal to the thickness of the second toothed wheel 13. The second toothed wheel 13 is in one piece with the radially-extending portion 30.

The axially-extending portion 29 of the intermediate connection bodies 28 is connected to the first toothed wheel 12 and extends axially with respect to it. The axially-extending portion 29 extends from the second zone 30b of the radially-extending portion 30. The axially-extending portion 29 is formed in one piece with the radially-extending portion 30.

The axially-extending portion 29 is also formed in one piece with the first toothed wheel 12.

The axially-extending portion 29 extends in the axial direction by the same amount that axially separates the first 12 and the second toothed wheel 13.

The axially-extending portion 29 has a radially inner surface 29a illustrated in FIG. 1B. The extension in the circumferential direction ECI of the axially-extending portion 29 is measured at the radially inner surface 29a.

The circumferential extension given by the sum of the circumferential extensions ECC, ECI of the axially-extending portions 26, 29 of the main connection bodies 25 and of the intermediate connection bodies 28 is comprised between 70° and 110°.

The circumferential extension given by the sum of the circumferential extensions ECI of the axially-extending portions 29 of the intermediate connection bodies 28 is comprised between 40% and 65% of the circumferential extension ECC given by the sum of the circumferential extensions ECC, ECI of the axially-extending portions 26 of the main connection bodies 25 and of the axially-extending portions 29 of the intermediate connection bodies 28.

In the embodiment represented in FIGS. 1 and 4 in which the first toothed wheel has 23 teeth, the circumferential extension ECI of the axially-extending portions 29 of the intermediate connection bodies 28 is 57% with respect to the sum of the circumferential extensions ECC, ECI of the axially-extending portions 26 of the main connection bodies 25 and of the axially-extending portions 29 of the intermediate connection bodies 28. In absolute value, the circumferential extension ECI of the axially-extending portions 29 of the intermediate connection bodies 28 is 43.5°. In absolute value, the circumferential extension ECC of the axially-extending portions 26 of the main connection bodies 25 is 33.5°.

Figure 5:
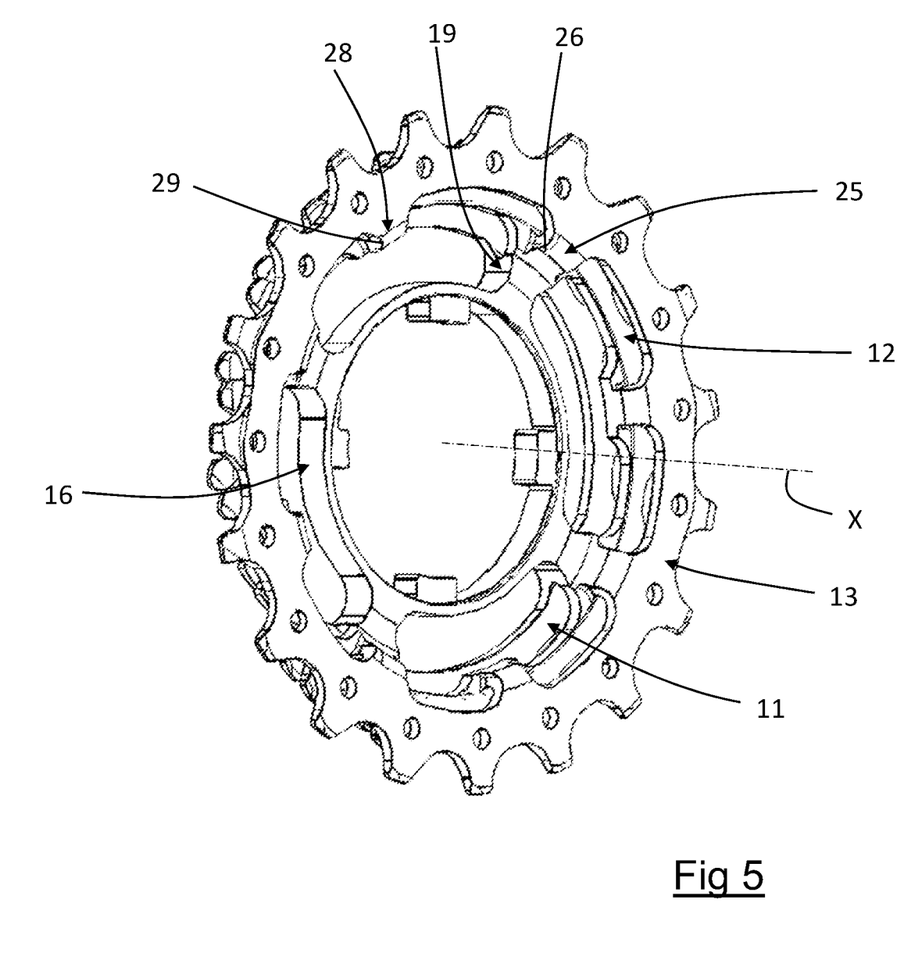
FIG. 5 is a perspective view of a further toothed wheel assembly for a cassette according to the invention.

In the embodiment represented in FIG. 5 in which the first toothed wheel has 17 teeth, the circumferential extension ECI of the axially-extending portions 29 of the intermediate connection bodies 28 is 44% with respect to the sum of the circumferential extensions ECC, ECI of the axially-extending portions 26 of the main connection bodies 25 and of the axially-extending portions 29 of the intermediate connection bodies 28. In absolute value, the circumferential extension ECI of the axially-extending portions 29 of the intermediate connection bodies 28 is 35.2°. In absolute value, the circumferential extension ECC of the axially-extending portions 26 of the main connection bodies 25 is 44.8°.

As can be seen in FIG. 4, the axially-extending portions 29 of the intermediate connection bodies 28 comprise a radially-extending foot 33 (also illustrated in FIG. 3) connected to the radially inner edge 12a of the first toothed wheel 12. Such a foot 33 has the function of bringing the axially-extending portion 29 back to the same radial height as the radially inner edge 12a of the first toothed wheel 12 and thus allowing the connection of the axially-extending portion 29 to the first toothed wheel 12.

Concerning this, the axially-extending portion 29 of each intermediate connection body 28 is a minimum radial distance from the center C of the first toothed wheel 12 that is less than the second radial distance R2.

In the preferred embodiment of the invention, the radially inner surface 29a of the axially-extending portion 29 of each intermediate connection body 28 is entirely arranged a same minimum radial distance from the center C of the first toothed wheel 12.

Such a minimum radial distance, hereinafter third radial distance R3, is represented in FIG. 4.

The third radial distance R3 is also greater than the first radial distance R1.

The first radial distance R1 and the second radial distance R2 are linked by the formula $0.2<RP/[(R2-R1)*R1]<1$, where RP is the primitive radius of the second toothed wheel 13 defined as the radius of the circumference centered on the center C of the toothed wheel assembly 10 and that passes through the center of the bushes of the chain when the latter is engaged on such a toothed wheel.

In greater detail, the first radial distance and the second radial distance are linked by the formula $0.4<RP/[(R2-R1)*R1]<0.8$.

In the embodiment represented in FIGS. 1 and 4 in which the second toothed wheel 13 has 25 teeth and the first toothed wheel has 23 teeth, the difference between the second radial distance R2 and the first radial distance R1 is 4 millimeters.

The third radial distance R3 and the second radial distance R2 are linked by the formula $0.2<RP/[(R2-R3)*R3]<1$.

In greater detail, the third radial distance R3 and the second radial distance R2 are linked by the formula $0.4<RP/[(R2-R3)*R3]<0.8$.

In the embodiment represented in FIGS. 1 and 4 in which the second toothed wheel 13 has 25 teeth and the first toothed wheel has 23 teeth, the difference between the second radial distance R2 and the third radial distance R3 is 2.5 millimeters.

The assembly 10 can comprise a third toothed wheel 11, like in the examples of the attached figures.

The third toothed wheel has a number of teeth 14 smaller than the number of teeth 14 of the first toothed wheel 12 and has a smaller diameter with respect to that of the first toothed wheel 12.

The third toothed wheel 11 is also connected to the radially inner cylindrical portion 16 by the spokes 19.

The spokes 19 are also connected to a radially inner edge 11a of the third toothed wheel 11.

In embodiments that are not illustrated, the assembly 10 can comprise further toothed wheels constrained to the third toothed wheel 11 (in the case in which the further toothed wheels have smaller diameters decreasing with respect to the diameter of the third toothed wheel 11) or to the second toothed wheel 13 (in the case in which the further toothed wheels have greater diameters increasing with respect to the diameter of the second toothed wheel 13).

A cassette (not illustrated) can comprise from one to three assemblies of toothed wheels 10 described above and also one or more single toothed wheel.

Of course, those skilled in the art can bring numerous modifications and variants to the invention described above, in order to satisfy specific and contingent requirements, all in any case encompassed by the scope of protection of the present invention as defined by the following claims

What is claimed is:

1. A toothed wheel assembly for a cassette, comprising:
at least one first toothed wheel having a center and a second toothed wheel concentric to the first toothed wheel, the second toothed wheel has a number of teeth greater than the number of teeth of the first toothed wheel;
a radially inner cylindrical portion configured to engage a sprocket support body of a bicycle wheel; and
a plurality of spokes comprising respective first constraining portions to the first toothed wheel and second constraining portions to the radially inner cylindrical portion to constrain the first toothed wheel to the radially inner cylindrical portion;
a plurality of connection bodies connecting the first and the second toothed wheel, each connection body comprising an axially extending portion to axially space the first toothed wheel from the second toothed wheel;
wherein, on at least one pair of spokes, respective connection bodies are provided having said axially extending portions with an extension in a circumferential direction, the radial projection of said extension in the circumferential direction being at least partially contained in a minimum extension in the circumferential direction of a respective spoke,
wherein the first toothed wheel has a radially outer edge that defines a sequence of teeth interspersed with recesses and a radially inner edge opposite the radially outer edge; and
wherein a first radial distance, measured with respect to the center of the first toothed wheel, of a radially innermost point of any connection body is less than a second radial distance, measured with respect to the center of the first toothed wheel, of a radially outermost point of the radially inner edge of the first toothed wheel.

2. The toothed wheel assembly according to claim 1, wherein said axially extending portion of each connection body provided at a respective spoke has an extension in the circumferential direction, the radial projection of which is completely contained in the maximum extension in the circumferential direction of a respective spoke at the second constraining portion thereof to said radially inner cylindrical portion.

3. The toothed wheel assembly according to claim 1, wherein a respective connection body is provided at each spoke.

4. The toothed wheel assembly according to claim 1, wherein, between two circumferentially consecutive connection bodies, said radially inner edge of the first toothed wheel lies on a reference circumference centered on the center of the first toothed wheel; said second radial distance being measured with respect to said reference circumference.

5. The toothed wheel assembly according to claim 1, wherein at least one intermediate connection body is provided between two connection bodies arranged at two circumferentially adjacent spokes to connect and axially space the first and the second toothed wheel.

6. The toothed wheel assembly according to claim 1,
wherein said intermediate connection body has a third radial distance of a radially innermost point measured with respect to the center of the first toothed wheel; and
wherein said third radial distance is less than said second radial distance and greater than the first radial distance.

7. The toothed wheel assembly according to claim 6,
wherein said intermediate connection body comprises an axially extending portion connected to the first toothed wheel; and
wherein the axially extending portion of the intermediate connection bodies has a circumferential extension less than the circumferential extension of the axially extending portion of the connection bodies at the spokes.

8. The toothed wheel assembly according to claim 1, wherein the first radial distance and the second radial distance are linked by the formula $$0.2 < RP/[(R2-RI)*RI] < 1,$$

where RP is the primitive radius of the second toothed wheel, R2 is the second radial distance and RI is the first radial distance.

9. A toothed wheel assembly for a cassette, comprising:
at least one first toothed wheel having a center and a second toothed wheel concentric to the first toothed wheel, the second toothed wheel has a number of teeth greater than the number of teeth of the first toothed wheel;
a radially inner cylindrical portion configured to engage a sprocket support body of a bicycle wheel; and
a plurality of spokes comprising respective first constraining portions to the first toothed wheel and second constraining portions to the radially inner cylindrical portion to constrain the first toothed wheel to the radially inner cylindrical portion;
a plurality of connection bodies connecting the first and the second toothed wheel, each connection body comprising an axially extending portion to axially space the first toothed wheel from the second toothed wheel;
wherein, on at least one pair of spokes, respective connection bodies are provided having said axially extending portions with an extension in a circumferential direction, the radial projection of said extension in the circumferential direction is at least partially contained in a minimum extension in the circumferential direction of a respective spoke,
wherein at least one intermediate connection body is provided between two connection bodies arranged at two circumferentially adjacent spokes to connect and axially space the first and the second toothed wheel, and
wherein said intermediate connection body comprises an axially extending portion connected to the first toothed wheel, the circumferential extension given by the sum of the circumferential extensions of the axially extending portions of the connection bodies at the spokes and of the intermediate connection bodies being comprised between 70° and 110°.

10. A toothed wheel assembly for a cassette, comprising:
at least one first toothed wheel having a center and a second toothed wheel concentric to the first toothed wheel, the second toothed wheel has a number of teeth greater than the number of teeth of the first toothed wheel;
a radially inner cylindrical portion configured to engage a sprocket support body of a bicycle wheel; and
a plurality of spokes comprising respective first constraining portions to the first toothed wheel and second constraining portions to the radially inner cylindrical portion to constrain the first toothed wheel to the radially inner cylindrical portion;
a plurality of connection bodies connecting the first and the second toothed wheel, each connection body comprising an axially extending portion to axially space the first toothed wheel from the second toothed wheel;
wherein, on at least one pair of spokes, respective connection bodies are provided having said axially extending portions with an extension in a circumferential direction, the radial projection of said extension in the circumferential direction is at least partially contained in a minimum extension in the circumferential direction of a respective spoke,
wherein at least one intermediate connection body is provided between two connection bodies arranged at two circumferentially adjacent spokes to connect and axially space the first and the second toothed wheel, and
wherein said intermediate connection body comprises an axially extending portion connected to the first toothed wheel, the circumferential extension given by the sum of the circumferential extensions of the axially extending portions of the intermediate connection bodies being comprised between 40% and 65% of the circumferential extension given by the sum of the circumferential extensions of the axially extending portions of the connection bodies arranged at the spokes and of the axially extending portions of the intermediate connection bodies.

11. A toothed wheel assembly for a cassette, comprising:
at least one first toothed wheel having a center and a second toothed wheel concentric to the first toothed wheel, the second toothed wheel has a number of teeth greater than the number of teeth of the first toothed wheel;
a radially inner cylindrical portion configured to engage a sprocket support body of a bicycle wheel; and
a plurality of spokes comprising respective first constraining portions to the first toothed wheel and second constraining portions to the radially inner cylindrical portion to constrain the first toothed wheel to the radially inner cylindrical portion;
a plurality of connection bodies connecting the first and the second toothed wheel, each connection body comprising an axially extending portion to axially space the first toothed wheel from the second toothed wheel;
wherein, on at least one pair of spokes, respective connection bodies are provided having said axially extending portions with an extension in a circumferential direction, the radial projection of said extension in the circumferential direction is at least partially contained in a minimum extension in the circumferential direction of a respective spoke,
wherein at least one intermediate connection body is provided between two connection bodies arranged at two circumferentially adjacent spokes to connect and axially space the first and the second toothed wheel, and wherein said intermediate connection body comprises a radially extending portion that extends in the radial direction towards the second toothed wheel and that is circumferentially delimited by two end edges converging in the radially inner direction.

12. The toothed wheel assembly according to claim 10, wherein the axially extending portions of the intermediate connection bodies are comprised between 55% and 60% of the circumferential extension given by the sum of the circumferential extensions of the axially extending portions of the connection bodies arranged at the spokes and of the axially extending portions of the intermediate connection bodies.

13. A toothed wheel assembly for a cassette, comprising:
at least one first toothed wheel having a center and a second toothed wheel concentric to the first toothed wheel, the second toothed wheel has a number of teeth greater than the number of teeth of the first toothed wheel;
a radially inner cylindrical portion configured to engage a sprocket support body of a bicycle wheel; and
a plurality of spokes comprising respective first constraining portions to the first toothed wheel and second constraining portions to the radially inner cylindrical portion to constrain the first toothed wheel to the radially inner cylindrical portion;
a plurality of connection bodies connecting the first and the second toothed wheel, each connection body comprising an axially extending portion to axially space the first toothed wheel from the second toothed wheel;

wherein, on at least one pair of spokes, respective connection bodies are provided having said axially extending portions with an extension in a circumferential direction, the radial projection of said extension in the circumferential direction is at least partially contained in a minimum extension in the circumferential direction of a respective spoke, and wherein a thickness in the axial direction of the radially inner cylindrical portion is comprised between 2 and 3 times a thickness in the axial direction of the first toothed wheel.

14. The toothed wheel assembly according to claim 13, wherein a thickness in the radial direction of the radially inner cylindrical portion is comprised between 0.7 and 1 times a thickness in the axial direction of the first toothed wheel.

15. A cassette for a bicycle wheel comprising at least one toothed wheel assembly according to claim 1.

16. A cassette for a bicycle wheel comprising at least one toothed wheel assembly according to claim 9.

17. A cassette for a bicycle wheel comprising at least one toothed wheel assembly according to claim 10.

18. A cassette for a bicycle wheel comprising at least one toothed wheel assembly according to claim 11.

19. A cassette for a bicycle wheel comprising at least one toothed wheel assembly according to claim 13.

* * * * *